Figure 1:
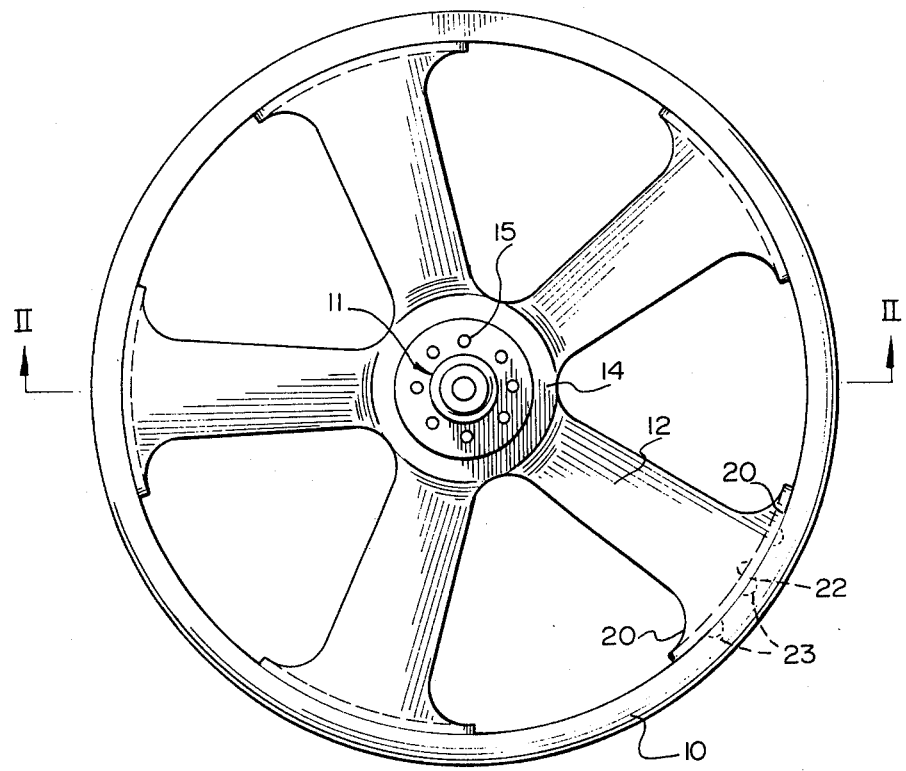

United States Patent [19]

Sardinha

[11] 4,046,425  
[45] Sept. 6, 1977

[54] WHEEL

[76] Inventor: Manuel Domingos Sardinha, 337 Palmerston Blvd., Toronto, Canada

[21] Appl. No.: 619,208

[22] Filed: Oct. 3, 1975

[30] Foreign Application Priority Data

June 30, 1975 Canada .................... 230514

[51] Int. Cl.² ........................................... B60B 23/00
[52] U.S. Cl. ............................................... 301/12 R
[58] Field of Search .............. 301/5 R, 10 R, 11 R, 301/11 CD, 12 R, 12 M, 18, 35 R, 63 R, 63 DD, 63 DT, 63 DS, 64 R, 64 SH, 67, 73, 79, 95, 104, 28

[56] References Cited

U.S. PATENT DOCUMENTS

| 1,653,372 | 12/1927 | Price | 301/12 R |
| 1,809,655 | 6/1931 | Walther | 301/12 R |
| 2,000,573 | 5/1935 | Spatta | 301/64 SH |
| 2,007,892 | 7/1935 | Farr | 301/67 |

Primary Examiner—Robert B. Reeves  
Assistant Examiner—H. Grant Skaggs  
Attorney, Agent, or Firm—C. Bruce Hamburg

[57] ABSTRACT

A wheel comprises a sheet metal rim of radially outwardly open, generally U-shaped cross-section, a central portion extending around a hub and a plurality of spoke portions extending radially outwardly from the central portion to the rim. Each of the spoke portions is of sheet metal and has a closed, hollow transverse cross-section. Curved metal strips contiguous with the inner periphery of the rim are secured within the radially outermost ends of the spoke portions, and releasable fasteners secure the rim to the curved metal strips. This wheel is of rugged construction, the rim being readily replaceable, and obviates the adjustment of multiple wire spokes required in conventional bicycle wheels.

1 Claim, 2 Drawing Figures

WHEEL

The present invention relates to wheels, and is useful in particular in connection with bicycle wheels.

The conventional bicycle wheel comprises an annular channel-shaped rim of radially outwardly open configuration connected to a central portion, extending around a hub, by a plurality of wire spokes. Each of the wire spokes is secured, at its radially outermost end, by means of an adjustable threaded member to the rim. When the wheel is assembled, the numerous wire spokes have to be adjusted by rotation of their respective threaded members to provide even tension in the wire spokes such that the wheel is symmetrical. The wire spokes are relatively fragile and, in the case of a fall or an impact of the wheel against a bump, for example a curb, the wire spokes and the rim may become distorted. In that case, considerable time-consuming labour is required to repair the wheel and, if the rim requires replacement, then each of the numerous wire spokes must be adjusted relative to the new rim.

It is an object of the present invention to provide a novel and improved wheel which is of light-weight and strong construction and which allows quick replacement of its rim, when necessary.

According to the present invention, there is provided a wheel comprising a sheet metal rim of radially outwardly open, generally U-shaped cross-section, a central portion extending around a hub, and a plurality of spoke portions extending radially outwardly from the central portion to the rim, each of the spoke portions being of sheet metal and having a closed, hollow transverse cross-section, a plurality of curved metal strips contiguous with the inner periphery of the rim, the strips being secured to the radially outermost ends of the spoke portions within the spoke portions, and releasable fasteners securing the rim to the curved metal strips.

Preferably, a part of each spoke portion and a part of the central portion are integral.

This provides a strong and rugged connection between the hub and the rim. At the same time, the releasable fasteners and the curved metal strips employed for the securing of the rim to the spoke portions enable the rim to be readily removed for repair or replacement.

Figure 2:
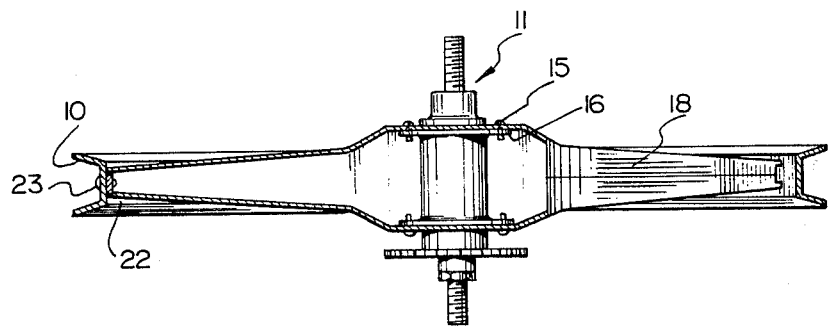

The invention will be more readily understood from the following description of a preferred embodiment thereof given, by way of example, with reference to the accompanying drawing, in which:

FIG. 1 shows a side elevation of a bicycle wheel embodying the present invention; and FIG. 2 shows a view taken in section along the line II—II of FIG. 1.

The bicycle wheel illustrated in the drawing has a rim 10 which, as can be seen more readily from FIG. 2, has a radially outwardly open, generally U-shaped cross-section.

The rim 10 is secured to a hub, which is indicated generally by reference numeral 11 and which may incorporate a brake unit or a variable gear ratio mechanism, by means of spoke portions 12 and a generally annular central portion 14 at the inner end of the spoke portions 12.

The central portion 14 is secured by screws 15 to annular flanges 16 of the hub 11.

The spoke portions 12 are of closed, generally rectangular, hollow transverse cross-section and are each formed in two halves, which are secured together along mutually welded edges indicated by reference numeral 18 in FIG. 2, these welded edges 18 extending in the plane of the wheel, i.e. the plane of symmetry transverse to the axis of the hub 11.

As can be seen from FIGS. 1 and 2, the spoke portions 12 are shaped such that each is radially outwardly divergent in the plane of the wheel over a major portion of the length of the spoke portion, as illustrated in FIG. 1, and also so that each spoke portion is radially outwardly convergent, in a plane transverse to that of the wheel, i.e. in the plane of FIG. 2, over the length of the spoke portion 12.

At its radially outermost end, each spoke portion 12 is outwardly divergent to form projections 20, in the plane of the wheel, at opposite sides of the spoke portion 12. A curved metal reinforcement strip 22 is secured in the radially outermost end of each spoke member 12 by welding, the curved metal strip 22 extending, as can be seen from FIG. 1, to the projections 20 and being curved in conformity with the inner periphery of the rim 10. The rim 10 is secured to the curved metal strip 22 by screws 23 extending through the rim 10 into threaded engagement with the curved metal strips 22.

The central portion 10 is formed in two halves which are secured together at the adjacent edges 18, each half of the central portion 14 being formed in one piece with a respective half of each of the spoke portions 12, so that the central portion 14 and the spoke portions 12 are formed in two symmetrical halves joined together along the edges 18. Preferably, these two halves are manufactured by blanking, piercing and forming the sheet metal.

The sheet metal employed in the embodiment of the invention illustrated in the drawing is mild steel, but other relatively light-weight metal may be substituted, e.g. aluminum. The curved reinforcement strips 22 are of thicker gauge than the sheet metal of the spoke portions 12 and the central portion 14 and may, for example, be of mild steel.

Although not illustrated in the drawing, it will be appreciated that when the wheel is in use, a conventional rubber tire is secured around the rim 10 in the normal manner.

I claim:

1. A bicycle wheel, comprising a metal rim of radially outwardly open, generally U-shaped cross-section, a central portion extending around a hub, a plurality of spoke portions extending radially outwardly from the central portion to the rim, each of the spoke portions having a closed, hollow transverse cross-section, a plurality of curved metal strips contiguous with the inner periphery of the rim, the strips being secured to the radially outermost ends of the spoke portions within the spoke portions, and a plurality of releasable threaded fasteners securing the rim to the curved metal strips, said threaded fasteners extending radially inwardly through said rim into threaded engagement with said metal strips, the central portion and the spoke portions each being formed of two halves joined together in a plane transverse to the axis of the hub of the wheel, and each half of the central portion being integral with a respective half of each of the spoke portions, and the central portion and the spoke portions being made of lightweight metal.

* * * * *